Patented Dec. 8, 1925.

1,564,706

UNITED STATES PATENT OFFICE.

JOHN WALTER OELHAFEN, OF TOMAHAWK, WISCONSIN.

WALL-BOARD COMPOSITION.

No Drawing.　　Application filed September 4, 1924.　Serial No. 735,956.

*To all whom it may concern:*

Be it known that I, JOHN WALTER OELHAFEN, a citizen of the United States, and a resident of Tomahawk, in the county of Lincoln and State of Wisconsin, have invented certain new and useful Improvements in Wall-Board Compositions, of which the following is a specification.

This invention relates to building material and more particularly to a composition for use in building constructions.

An object of the invention is the provision of a composition which may be used as a substitute for lumber, lathes and plaster and as a substitute for wood in the production of furniture.

A further object of the invention is the provision of a composition which when in plastic state may be molded into any form desired and replace a number of the materials now used in the formation of moldings.

A still further object of the invention is the provision of a composition adapted as a substitute for many of the building materials and which has a sufficient degree of strength and hardness for the purpose.

Another object of the invention is the provision of a slightly compressed composition adapted as a substitute for building materials and which when the same is in the finished state will have sufficient air pockets in it to form an insulator against heat or cold and to provide a material of such texture that nails may be driven through the same without causing splitting or cracking of the products.

This invention will be best understood from a consideration of the following detailed description, nevertheless it is to be understood that the invention is not confined to the disclosure, being susceptible of such changes and modifications which shall define no material departure from the salient features of the invention as expressed in the appended claims.

In carrying out my invention it is to be observed that sawdust, finely ground, is the principal ingredient of the composition and to which other materials are added to give the product the proper strength and body.

It has been found that a mixture of sawdust, silicate of soda and whiting give the best results and a small quantity of common molasses diluted to ½ its strength which, when added to the composition, not only provides a material of greater strength but the use of the molasses forms a substitute for a small quantity of the sodium silicate. The percentages of the ingredients are as follows: 5% whiting, 5% sodium silicate, 1% common molasses diluted by an equal quantity of water, 89% common sawdust.

The sawdust when directly received from a saw mill is unsatisfactory for the preparation of the composition because of its coarseness and therefore the same must be ground to about the consistency of granulated sugar. The ground sawdust then is moistened with the diluted molasses and the whiting is then added after which the sodium silicate is placed in the mixture. The ingredients are intimately mixed by any approved mechanical means to such an extent that a certain quantity of air is incorporated in the ingredients.

It must be borne in mind that it is not essential that the molasses be used as part of the composition since sodium silicate may replace the quantity of molasses indicated above.

The whiting not only acts as a drier but gives strength and body to the finished product. Other materials, such as dry building cement or materials similar to whiting may be used with results sufficient for certain purposes.

After the ingredients have been thoroughly incorporated the composition is run out through rollers or otherwise formed into sheets or objects of the desired dimensions and the same is either kiln or air dried until it has reached the proper degree of strength and hardness.

When the sheet or articles are formed the pressure to which the composition is subjected after the ingredients have been mixed must be such that all air from the molds should not be forced therefrom since it is desired to have a sufficient quantity of air impregnating the mixture in order to provide dead air pockets uniformly distributed throughout the product so that the same will act as an insulator against heat or cold. Furthermore when the pressure has been properly limited the air pockets will not only provide an insulating material but will permit a nail to be driven close to the edges of boards thus constructed without causing splitting or cracking. Thus when a nail is driven into material so produced the materials should be sufficiently elastic, due to the air pockets, to permit compression of the material without splitting.

Other materials such as paper, hair and fibrous materials may be added to the mixture to replace some of the sawdust for the purpose of strengthening the product and such product may be further reinforced by metal or wooden strips. When desired a water-proof coating may be applied to the surface.

Due to the plastic state of the materials before they are dried, the materials may be molded to form any surface design so that in the preparation of wall boards, more particularly for the ceiling of a dining room, clusters of fruit or other designs or figures may be embossed during the formation of the board. Furthermore both surfaces of a wall board may be covered by such materials as paper, burlap or other similar material to form a smooth surface which may be painted or otherwise finished in a decorative manner.

What I claim is:

1. A wall board composition comprising 89% sawdust, 1% molasses, 5% sodium silicate, and 5% whiting.

2. A wall board composition comprising 89% sawdust, 1% molasses, 5% sodium silicate, and 5% whiting, said ingredients being slightly compressed into form to permit the retention of a certain quantity of air distributed throughout the mixture to provide air pockets.

JOHN WALTER OELHAFEN.